(12) United States Patent
Han et al.

(10) Patent No.: US 11,805,022 B2
(45) Date of Patent: Oct. 31, 2023

(54) METHOD AND DEVICE FOR PROVIDING NETWORK ANALYTICS INFORMATION IN WIRELESS COMMUNICATION NETWORK

(71) Applicant: Samsung Electronics Co., Ltd., Suwon-si (KR)

(72) Inventors: Yoonseon Han, Suwon-si (KR); Jungshin Park, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/013,434

(22) PCT Filed: Jun. 9, 2021

(86) PCT No.: PCT/KR2021/007190
§ 371 (c)(1),
(2) Date: Dec. 28, 2022

(87) PCT Pub. No.: WO2022/005037
PCT Pub. Date: Jan. 6, 2022

(65) Prior Publication Data
US 2023/0269141 A1    Aug. 24, 2023

(30) Foreign Application Priority Data
Jun. 30, 2020 (KR) .................. 10-2020-0080174

(51) Int. Cl.
*G06F 15/173* (2006.01)
*H04L 41/14* (2022.01)
*H04L 41/0604* (2022.01)

(52) U.S. Cl.
CPC .......... *H04L 41/14* (2013.01); *H04L 41/0622* (2013.01)

(58) Field of Classification Search
CPC .................. H04L 41/14; H04L 41/0622
(Continued)

(56) References Cited

U.S. PATENT DOCUMENTS 11,695,680 B2 * 7/2023 Lee ................ H04L 43/50
709/224
2019/0222489 A1 * 7/2019 Shan ............... H04L 41/5032
(Continued)

FOREIGN PATENT DOCUMENTS

WO    2020/004773 A1    1/2020

OTHER PUBLICATIONS

5G; Procedures for the 5G system (5GS)', ETSI TS 123 502 V15.5.1, May 31, 2019.

*Primary Examiner* — Hee Soo Kim
(74) *Attorney, Agent, or Firm* — Jefferson IP Law, LLP

(57) ABSTRACT

Disclosed are a method and device for providing network analytics information in a wireless communication network. A method for providing network analytics information by means of a network data collection and analytics function (NWDAF) entity in a wireless communication network may comprise the steps of: receiving, from a consumer network function (NF), a request message including information indicating a request time interval related to analytics information; in response to the request message, transmitting, to the consumer NF, a response message including information notifying that real-time analytics information can be provided; and transmitting, to the consumer NF, the analytics information corresponding to the request message within the request time interval.

20 Claims, 9 Drawing Sheets

(58) Field of Classification Search
USPC .......................................................... 709/224
See application file for complete search history.

(56) References Cited

U.S. PATENT DOCUMENTS

| | | |
|---|---|---|
| 2020/0045559 A1 | 2/2020 | Kim et al. |
| 2020/0196169 A1 | 6/2020 | Dao et al. |
| 2020/0358689 A1* | 11/2020 | Lee ........................ H04L 43/028 |
| 2021/0306231 A1* | 9/2021 | Lee ........................ H04L 43/55 |
| 2023/0079052 A1* | 3/2023 | Bega ..................... H04W 24/10 |
| | | 709/224 |
| 2023/0224752 A1* | 7/2023 | Huang ................... H04L 47/822 |
| | | 370/252 |

\* cited by examiner

METHOD AND DEVICE FOR PROVIDING NETWORK ANALYTICS INFORMATION IN WIRELESS COMMUNICATION NETWORK

CROSS-REFERENCE TO RELATED APPLICATION(S)

This application is a U.S. National Stage application under 35 U.S.C. § 371 of an International application number PCT/KR2021/007190, filed on Jun. 9, 2021, which is based on and claims priority of a Korean patent application number 10-2020-0080174, filed on Jun. 30, 2020, in the Korean Intellectual Property Office, the disclosure of which is incorporated by reference herein in its entirety.

TECHNICAL FIELD

The disclosure relates to a method and device for providing network analytics information for management of a wireless communication network.

BACKGROUND ART

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post long-term evolution (LTE)/LTE-advanced (LTE-A) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multiple-input multiple-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, healthcare, or smart appliance industry, or state-of-art medical services, through conversion or integration of existing IT technologies and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a big data processing technique may be said to be an example of the convergence of the 5G and IoT technologies.

5G mobile communication may use various radio access technologies that have been adopted in legacy 3G or 4G (LTE) communication and need wider frequency bands due to adoption of high frequencies, and to meet higher communication requirements, more base stations are expected to be installed. In this situation, a need exists for technologies for efficiently managing radio resources and devices to reduce costs or power required for network management or to minimize interference.

DETAILED DESCRIPTION OF THE INVENTION

Technical Problem

Based on the foregoing discussions, the disclosure may provide a device and method for providing network analytics information in a wireless communication system.

The disclosure may provide a device and method for providing real-time analytics information by the network data collection and analysis function (NWDAF) in a wireless communication network.

The disclosure may provide a device and method for managing capabilities related to providing real-time analytics information of a network data collection and analysis function (NWDAF) entity in a wireless communication network.

The disclosure may provide a device and method for providing real-time analytics information according to a request of a network function (NF) or a subscription request.

The disclosure may provide a device and method corresponding to a change in analytics information request in a network function (NF).

Technical Solution

According to an embodiment of the disclosure, a method for providing network analytics information by a network data collection and analysis function (NWDAF) entity in a wireless communication network may comprise receiving a request message including information indicating a required time range related to analytics information from a consumer network function (NF), transmitting, to the consumer NF, a response message including information indicating that it is possible to provide real-time analytics information in response to the request message, and transmitting the analytics information corresponding to the request message to the consumer NF within the required time range.

According to an embodiment of the disclosure, a device of a network data collection and analysis function (NWDAF) entity providing network analytics information in a wireless communication network may comprise a transceiver and a controller functionally connected with the transceiver. The controller may be configured to receive a request message including information indicating a required time range related to analytics information from a consumer network function (NF), transmit, to the consumer NF, a response message including information indicating that it is possible to provide real-time analytics information in response to the request message, and transmit the analytics information corresponding to the request message to the consumer NF within the required time range.

According to an embodiment of the disclosure, a method for providing network analytics information by a network function (NF) entity in a wireless communication network may comprise transmitting a discovery request message including information requesting at least one capability related to providing real-time network analytics information to a network repository function (NRF), receiving a discovery response message including a list of at least one network data collection and analysis function (NWDAF) related to providing the real-time network analytics information from the NRF, selecting one NWDAF based on the list, transmitting a request message including information indicating a required time range related to analytics information to the selected NWDAF, receiving, from the NWDAF, a response message including information indicating that it is possible to provide real-time analytics information in response to the request message, and receiving the analytics information corresponding to the request message from the NWDAF within the required time range.

According to an embodiment of the disclosure, a device of a network function (NF) entity providing network analytics information in a wireless communication network may comprise a transceiver; and a controller functionally connected with the transceiver. The controller may be configured to transmit a discovery request message including information requesting at least one capability related to providing real-time network analytics information to a network repository function (NRF), receive a discovery response message including a list of at least one network data collection and analysis function (NWDAF) related to providing the real-time network analytics information from the NRF, select one NWDAF based on the list, transmit a request message including information indicating a required time range related to analytics information to the selected NWDAF, receive, from the NWDAF, a response message including information indicating that it is possible to provide real-time analytics information in response to the request message, and receive the analytics information corresponding to the request message from the NWDAF within the required time range.

MODE FOR CARRYING OUT THE INVENTION

Figure 1:
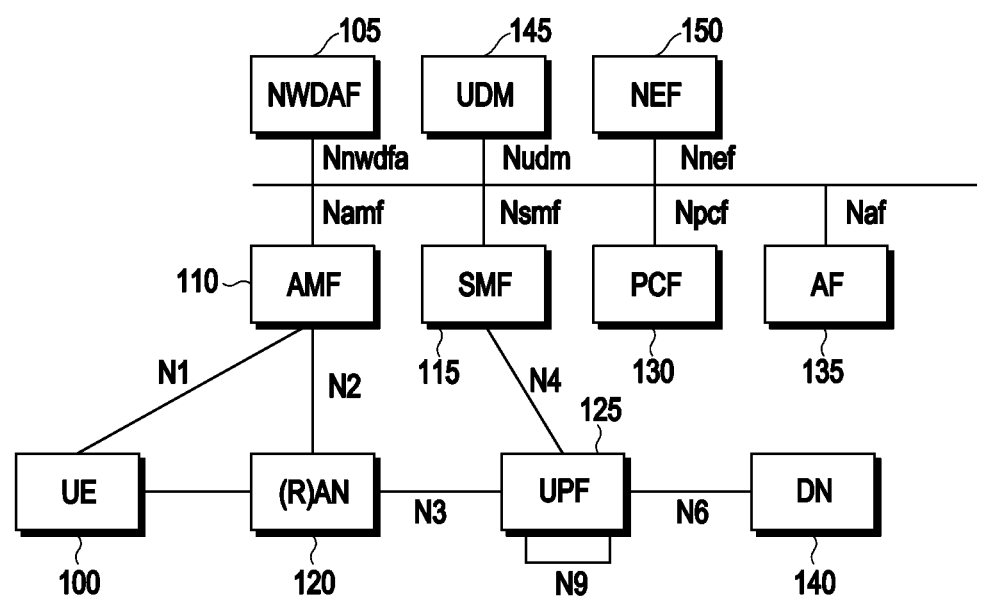
FIG. 1 is a view illustrating a configuration of a wireless communication network including a network data collection and analysis function (NWDAF) according to an embodiment of the disclosure.

Hereinafter, embodiments of the present invention are described in detail with reference to the accompanying drawings.

When determined to make the subject matter of the disclosure unclear, the detailed description of the related functions or configurations in the embodiments of the disclosure may be skipped. The terms as used herein are defined considering the functions in the present disclosure and may be replaced with other terms according to the intention or practice of the user or operator. Therefore, the terms should be defined based on the overall disclosure.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit or part" means a software element or a hardware element such as a field-programmable gate array (FPGA) or an application specific integrated circuit (ASIC). A 'unit' or 'part' may be configured to play a certain role. However, the term "unit" is not limited as meaning a software or hardware element. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments, a " . . . unit" may include one or more processors and/or devices.

For ease of description, some of the terms or names defined in the 3GPP long-term evolution (LTE)-based communication standards (e.g., 5G, NR, LTE, or similar system standards) may be used. However, the disclosure is not limited by such terms and names and may be likewise applicable to systems conforming to other standards.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

In particular, the disclosure may be applied to 3GPP NR (New Radio, 5th generation mobile communication standard). In the disclosure, base station (eNB) may be used interchangeably with gNB for convenience of description. In other words, the base station described as an eNB may represent a gNB. In other words, the base station may be an entity allocating resource to UE and may be at least one of gNode B, eNode B, Node B, base station (BS), wireless access unit, base station controller, or node over network. The user equipment (UE) may include a mobile station (MS), cellular phone, smartphone, computer, IoT devices, sensors, or multimedia system capable of performing communication functions. Of course, it is not limited to the above examples.

Further, the description of embodiments of the disclosure focuses primarily on the radio access network, new RAN (NR), and the core network, packet core (5G system, or 5G core network, or NG core, or next generation core), which are specified by the 3rd generation partnership (3GPP) which is a mobile communication standardization organization. However, the subject matter of the disclosure, or slight changes thereto, may also be applicable to other communication systems that share similar technical backgrounds without departing from the scope of the disclosure, which would readily be appreciated by one of ordinary skill in the art.

A unit performing each function provided by the 5G network system may be defined as an NF (or also referred to as NF entity). The NF may be at least one of an access and mobility management function (AMF) that manages access and mobility of the user equipment (UE) to an access network (AN), a session management function (SMF) that performs session-related management, a user plane function (UPF) that manages the user data plane, a network slice selection function (NSSF) that selects network slice instances available to the UE, a point coordination function (PCF), a network repository function (NRF) that manages network function profiles, an application function (AF), or an operation, administration, and maintenance (OAM).

In the 5G system, network data collection and analysis function (NWDAF) which is a network function for analyzing the data collected from the 5G network and providing it may be defined to support network automation. The NWDAF may collect/store/analyze information from the 5G network and provide the result to at least one network function (NF) (or NF entity), and the analysis result may be used independently in each NF.

The 5G mobile communication system supports the NFs to use the results of collection and analysis of network-related data (hereinafter referred to as network data) through the NWDAF. This is to provide the collection and analysis of network data necessary for each NF to effectively provide its own functions in a centralized form. The NWDAF may collect and analyze network data using a network slice as a basic unit. However, the scope of the disclosure is not limited to the network slice unit, and the NWDAF may additionally use various pieces of information including at least one of user equipment (UE), protocol data unit (PDU) session, NF state, or quality of service obtained from an external service server.

The result analyzed through NWDAF (which may be referred to hereinafter as network analytics information or analytics information) may be transferred to each NF that has requested the result. The analysis result may be used to optimize network management functions, such as quality of service (QoS) guarantee/enhancement, traffic control, mobility management, or load distribution.

The provision of network analytics information (or analytics information) representing the analysis result of network data may be performed through a process of collecting and processing necessary information at a request or the subscription of the consumer NF by the NWDAF. In this case, the entity sending the request to the NWDAF is not limited to such NFs as AMF, SMF, or PCF positioned inside the mobile communication network, and such functions as application function (AF) and operation, administration, and maintenance (OAM) may also send a subscription or request to the NWDAF.

The number of UEs using mobile communication networks and the number of services and applications to support them are increasing exponentially. Further, the design and operation of a radio access network and a core network are becoming increasingly sophisticated to enhance the quality of the mobile communication network. In this situation, in addition to devices simply using voice calls and data services, new types of devices, such as factories, unmanned aerial vehicles, robots, cars, and airplanes, are emerging. These new types of UEs are expected to steadily increase, and mobile communication networks would also continue to evolve services to effectively support their purposes.

While the purposes and types of UEs are changing, all UEs in the mobile communication network share radio resources, and in general, the core network is also operated to be shared by all UEs. However, since each UE has a different type and purpose, a difference may arise in operation type and used service and hence interoperation with the network. Therefore, the mobile communication network need maintain an optimized configuration by analyzing the purpose and service requirements for each UE so as to effectively support each type of UE. Further, to effectively support each UE and services, the network needs to be operated to continuously provide the desired level of services at the lowest cost through the understanding of the characteristics of each UE and optimization and automation of configuration and management.

Embodiments of the disclosure may collect the data generated in the past or currently being generated and analyze and use the current network status and service-related information in performing such operations as operating radio and core networks, ensuring quality of service, and providing optimized services. Use of such network analytics information may provide information for efficiently supporting such functions as UE mobility, performance of network functions, users' satisfaction of services, management of slice quality, optimization of traffic path, reduction in energy consumption in base station and core network, and detection abnormal UE and traffic. The network analytics information may also be used to supplement basic functions, such as mobility management, session management, and policy management, which are performed by the conventional core network, or increase efficiency.

According to an embodiment, the network analytics information may be provided as a statistical or numerical value obtained by collecting and analyzing the data generated basically in the past or be represented in the manner to predict a value at a specific future time. For example, there may be provided such analytics information as analysis/prediction of the moved position or moving path of a specific UE, or analysis/prediction of load information about a specific network function. In the 5G mobile communication system, the NWDAF may perform the function of providing such analytics information.

The network analytics information may be used when the NWDAF positioned in the core network or an entity corresponding to the NWDAF collects information from devices positioned inside or outside the network, analyzes it, and transfers the result. The above-described network analytics information may include analytics information related to the UE, wired/wireless network status information, and analytics information related to the service used by each UE and may include prediction information related to a future time as well as statistical analytics information about the past and current status.

The disclosure may include transferring the network analytics information, provided by the NWDAF, at a specific time (e.g., in real-time or in near real-time) in using the network analytics information in the mobile communication system. The network analytics information may be used to assist the network function in performing a specific determination behavior when performing a specific operation. The specific operation may be required to be executed under a specific condition which may include at least one of a specific time, place, network state, or subscriber state.

An embodiment may provide network analytics information within a specific time among the above-described conditions, allowing the network function, which has requested the network analytics information, to normally perform the specific determination or specific behavior. As an example, the specific time condition may include a time when a specific determination should be made. For example, when the AMF should respond within one minute in performing the UE's registration procedure, the NWDAF should complete transfer of the requested analytics information to the AMF within at least one minute for the AMF to normally perform its operation. If the transfer time of the network analytics information exceeds one minute, the network analytics information provided by the NWDAF may not be valid for the AMF.

In the above-described network analytics information-available environment, the network analytics information may be generated using various kinds of algorithms. Further, in the process of collecting and processing relevant information to generate analytics information, the time necessary to generate analytics information may differ depending on the type of the request of the network function. For example, the processing time necessary to generate analytics information may be varied depending on at least one of the type of analytics information, target for analytics information, event filter, or reporting cycle. Accordingly, to efficiently use analytics information, the NWDAF and the network function need a method for generating and using network analytics information in real-time or within a specific time range depending on use conditions.

Various embodiments of the disclosure may include operations for generating and transferring analytics information at a specific time, such as selection of the NWDAF to provide real-time network analytics (or referred to as real-time NWDAF communication), expected time of generation of analytics information, request for priority of analytics information, or negotiation for generation of analytics information, for the NWDAF to transfer network analytics information within a specific time range.

According to an embodiment, the NWDAF may include sub functions described below, to perform analysis functions. The NWDAF may be referred to as an NWDAF instance performing at least one of network data collection, storage of collected information, learning, storage of model, or inference. In an embodiment, each NWDAF instance may provide at least some of the sub functions. The model providing network analytics information may vary in accuracy and performance depending on the design and learning data of the model. When a plurality of NWDAFs provide the same analytics information, if the algorithms to generate analytics information differ between the NWDAFs, different results or performances may be provided from the NWDAFs.

In an embodiment, the NWDAF may consider the purpose and required performance of use of analytics information when selecting an NWDAF instance. An embodiment of the disclosure may provide an operation of selecting an NWDAF instance considering such characteristics. Thus, there may be provided an embodiment for obtaining precise analytics information in an appropriate period or context to fit the purpose in using network analytics information.

Effects obtainable from various embodiments are not limited to the foregoing, and other unmentioned effects would readily be appreciated by one of ordinary skill in the art from the following description.

Hereinafter, among various elements constituting the core network, devices directly related to the disclosure may be described by way of example.

FIG. 1 illustrates a configuration of entities related to a mobile communication system according to an embodiment of the disclosure. A configuration of interaction between the components via a service-based interface is shown here.

Referring to FIG. 1, an NWDAF 105 may collect network data from an AMF 110 or SMF 115, NFs in the 5G core network, such as UPFs 125, 130, and 135, an AF for efficiently providing a service, a network exposure function (NEF), or an operation, administration, and maintenance (OAM) in various manners. The AMF 110 may access the UE 100 and a radio access network (RAN) 120, and the UPF 125 may connect user traffic of the UE 100 through the RAN 120 to at least one data network (DN) 140.

In FIG. 1, the AMF 110 is a device for managing the access and mobility of the UE 100 and may play a role as a UE-core network end point for connecting the UE 100 with other devices in the core network via the RAN 120. The AMF 110 may provide functions, such as at least one of, e.g., registration of the UE 100, connection, reachability, mobility management, access identification/authentication, and mobility event generation.

The SMF 115 may perform a PDU session management function of the UE 100. For example, the SMF 115 may perform functions, such as at least one of session management functions of establishing, modifying, or releasing a session and maintaining a tunnel between the UPF 125 and the AN 120 necessary therefor, the functions of allocating and managing an IP address of the UE 100, allocation and retention priority (ARP) proxy functions, selection and control of the user plane, control of traffic processing on the UPF 125, and billing data gathering control.

The PCF 130 may play a role to determine and provide a policy for access/mobility and session management which is applied to the AMF 110 and the SMF 115. For example, the PCF 130 may manage (or govern) the behavior of the entire network and provide policies to be carried out to network functions constituting the control plane. Further, the PCF 130 may access information related to policy making by accessing the unified data repository (UDR).

The NEF 150 may be responsible for transmitting or receiving an event occurring in the mobile communication network and a supported capability to/from the outside. For example, the NEF 150 may perform functions, such as at least one of safe provisioning of external application information to the core network, conversion of internal/external information, and storing the functions received from other network functions in the UDR and redistributing them.

The UDM 145 and the UDR may be independent network functions, but since their functions and roles are similarly used in the embodiments of the disclosure, they are described simultaneously in the disclosure. The UDM 145 may perform at least one of, e.g., generation of authentication and key agreement (AKA) authentication information for 3GPP security, processing user identifier (ID), de-concealing of secured user identifier (e.g., subscription permanent identifier (SUPI) and/or subscription concealed identifier (SUCI)), management of a list of NFs currently supporting the UE, subscription data management, or management of short messaging service (SMS) subscription data. The UDR may perform the functions of storing and providing subscriber information managed by the UDM 145, structured data for exposure, and application data related to NEF 150 or service.

The UPF 125 may play a role to actually process user data and may transfer the packets generated by the UE to the data network 140 which is an external network or process the packets received from the data network 140 to be transferred to the UE. Major functions provided by the UPF 125 may include such functions as at least one of, e.g., acting as an anchor between radio access technologies, providing connectivity with PDU sessions and the data network 140, packet routing and forwarding, packet inspection, application of user plane policy, creating a traffic usage report, or buffering.

The NWDAF 105 may gather events or information occurring within the network and transfer statistics, predictions, and recommendation information related to specific information to the NF (e.g., 110, 115, 120, 125, 130, 140, 145, or 150), AF 135, and OAM using an analysis tool or machine learning tool. For example, the NWDAF 105 may perform at least one function among gathering network data from NF/AF/OAM, registering NWDAF services and exposing metadata, or providing network analytics information to the NF/AF. In other words, the NWDAF 105 may analyze the network data through intelligent technology, such as machine learning, based on the collected network data and provide the analysis results to the other NFs (e.g., NF, AF, or OAM) of the 5G core network, thereby assisting optimization and performance enhancement of each NF. Hereinafter, in the disclosure, NWDAF 105 and NWDAF instance may be interchangeably used. In other words, in the following description, NWDAF instance may mean an operation method of NWDAF.

Although not shown in FIG. 1, a UE radio capability management function (UCMF) may perform the function of storing and providing mapping information between the ID of the radio access-related function of the UE assigned by the PLMN or the manufacturer and the actual function in the form of a dictionary.

In an embodiment, the AF 135 may perform a function interworking with the core network of 3GPP to provide services. The AF 135 may be divided into a trusted case (Trusted) and an untrusted case (Untrusted). If the AF 135 has reliability, the AF 135 may utilize the services of network functions positioned inside the core network without a separate intermediate function, such as the NEF 150. In an embodiment, the functions provided by the AF 135 may include at least one of application influence on traffic routing, utilization of network information exposure function, interaction with the policy framework for policy control, and IP multimedia subsystem (IMS)-related interactions.

Although not shown in FIG. 1, OAM may refer to a device for managing an overall mobile communication network including a base station and a core network. For example, the OAM may perform functions related to at least one of communication network operation, management, maintenance, provisioning, and problem solving. The OAM may perform the functions of monitoring and configuring each base station or the core network to operate seamlessly according to the design and policy. The OAM is a concept that encompasses at least one of tools and procedures related to management and may be interpreted as including all tools, software, and procedures used by the network administrator for management, rather than denoting a specific device.

The UE 100 may be connected to the RAN 120 to access core network entities of the network. The core network of the mobile communication network (e.g., a 5G network) may include the functions described above. In an embodiment, RAN 120 may mean a 5G-RAN and may include a base station that provides a wireless communication function to the UE. The UE 100 may access the AMF 110 through the base station 120 and exchange control plane signaling messages with the 5G core network. The UE 100 may access the UPF 125 through the base station 120 and exchange user plane data with the data network (DN) 140.

The NWDAF 105 may collect and analyze the load level of the network slice instance and provide it to the NSSF to be used for selection to be used by a specific UE. The service-based interface defined in the 5G network may be used to request analytics information between the NFs (including at least one of, e.g., the AMF, SMF, UPF, NSSF, PCF, NRF, AF, or OAM) and the NWDAF 105 or transfer analytics information, and as a transfer method, at least one of HTTP or JSON-type documents may be used.

In an embodiment, the data collected by the NWDAF 105 may include at least one of the application identifier (ID) from the point coordination function (PCF), IP filter information, media/application bandwidth, the UE identifier from the AMF, location information, destination data network name (DNN) from the SMF, UE IP, QoS flow bit rate, QoS flow ID (QFI), QoS flow error rate, QoS flow delay, or traffic usage report from the UPF.

In an embodiment, the NWDAF 105 may additionally collect and use for analysis, at least one of the NF resource status from the OAM, which is an entity capable of influencing connection between the UE and the service server, other than the NFs constituting the core network, NF throughput, service level agreement (SLA) information, UE status from the UE 100, UE application information, UE usage pattern, the service application identifier received from the AF 135, service experience, or traffic pattern.

Tables 1 to 3 below show example network data collected by the NWDAF. The period and time when the NWDAF collects network data from each entity may differ from entity to entity. Further, the correlation between the collected data may be identified through the timestamp for recording the time of collection and the correlation ID for correlating the data of each collection target.

TABLE 1

| Information | Source | Description |
| --- | --- | --- |
| Application ID | AF | To identify the service and support analytics per type of service (the desired level of service) |
| IP filter information | AF | Identify a service flow of the UE for the application |
| Locations of Application | AF/NEF | Locations of application represented by a list of DNAI(s). The NEF may map the AF-Service-Identifier information to a list of DNAI(s) when the DNAI(s) being used by the application are statically defined. |
| Service Experience | AF | Refers to the QoE per service flow as established in the SLA and during on boarding. It can be either e.g., MOS or video MOS as specified in ITU-T P.1203.3 or a customized MOS |
| Timestamp | AF | A time stamp associated to the Service Experience provided by the AF, mandatory if the Service Experience is provided by the ASP. |

TABLE 2

| Information | Source | Description |
| --- | --- | --- |
| Timestamp | 5GC NF | A time stamp associated with the collected information. |
| Location | AMF | The UE location information. |
| SUPI(s) | AMF | If UE IDs are not provided as target of analytics reporting for slice service experience, AMF returns the UE IDs matching the AMF event filters. |
| DNN | SMF | DNN for the PDU Session which contains the QOS flow |
| S-NSSAI | SMF | S-NSSAI for the PDU Session which contains the QoS flow |
| Application ID | SMF | Used by NWDAF to identify the application service provider and application for the QoS flow |
| IP filter information | SMF | Provided by the SMF, which is used by NWDAF to identify the service data flow for policy control and/or differentiated charging for the QoS flow |
| QFI | SMF | QOS Flow Identifier |
| QOS flow Bit Rate | UPF | The observed bit rate for UL direction; and The observed bit rate for DL direction |
| QOS flow Packet Delay | UPF | The observed Packet delay for UL direction; and The observed Packet delay for the DL direction |
| Packet transmission | UPF | The observed number of packet transmission |
| Packet retransmission | UPF | The observed number of packet retransmission |

TABLE 3

| Information | Source | Description |
| --- | --- | --- |
| Timestamp | OAM | A time stamp associated with the collected information. |
| Reference Signal Received Power | OAM | The per UE measurement of the received power level in a network cell, including SS-RSRP, CSI-RSRP as specified in clause 5.5 of TS 38.331 and E-UTRA RSRP as specified in clause 5.5.5 of TS 36.331 |
| Reference Signal Received Quality | OAM | The per UE measurement of the received quality in a network cell, including SS-RSRQ, CSI-RSRQ as specified in clause 5.5 of TS 38.331 and E-UTRA RSRQ as specified in clause 5.5 of TS 36.331 |
| Signal-to-noise and interference ratio | OAM | The per UE measurement of the received signal to noise and interference ratio in a network cell, including SS-SINR, CSI-SINR, E-UTRA RS-SINR, as specified in clause 5.1 of TS 38.215 |

Figure 2:
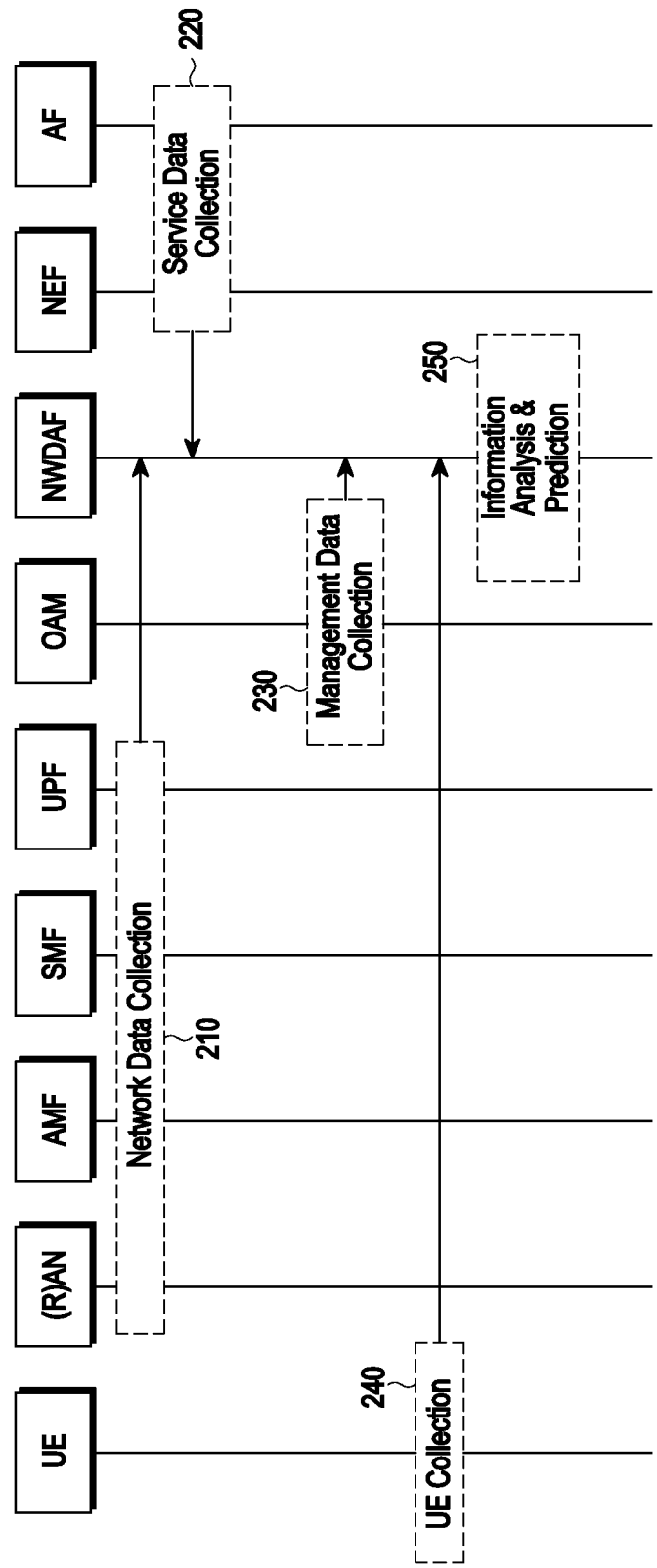
FIG. 2 is a signal flowchart illustrating a network data collection and analysis operation according to an embodiment of the disclosure.

FIG. 2 illustrates an overall structure of collecting and analyzing network data according to an embodiment of the disclosure.

Referring to FIG. in step 210, the NWDAF (e.g., the NWDAF 105) may collect network data from at least one NF among the RAN (e.g., the RAN 120), the AMF (e.g., the AMF 110), the SMF (e.g., the SMF 115), or the UPF (e.g., the UPF 125), in step 220, collect service data from the NEF (e.g., the NEF 150) or the AF (e.g., the AF 135), in step 230, collect management data from the OAM, and/or in step 240, collect UE data from the UE (e.g., the UE 100). An example of the collected data may be shown in Tables 1 to 3. In step 250, the NWDAF may analyze the collected data. The analyzed result may be provided to at least one consumer NF upon request.

Figure 3:
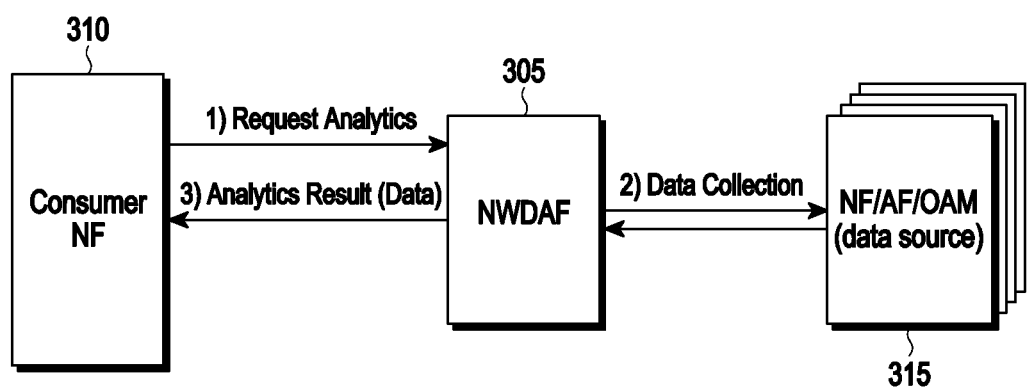
FIG. 3 illustrates an overall structure of a system of collecting and analyzing network data according to an embodiment of the disclosure.

FIG. 3 illustrates an overall operation of collecting and analyzing network data according to an embodiment of the disclosure.

Referring to FIG. 3, the consumer NF 310 may request analytics information generated as a result of analysis by the NWDAF 305 (e.g., the NWDAF 105) as in operation 1) and may be, e.g., at least one of the AMF (e.g., the AMF 110), the SMF (e.g., the SMF 115), the OAM, or the RAN (e.g., the RAN 120) constituting the core network. The NWDAF 305 may collect and analysis network data from the source NF 315, which may be, e.g., the NF, AF, or OAM, to generate analytics information requested by the consumer NF 310 as in operation 2). The NWDAF 305 may transfer the analytics information generated as a result of the analysis to the consumer NF 310 having transmitted the request as in operation 3). The consumer NF 310 may utilize the analytics information received from the NWDAF 305 to determine operations and control parameters for its own functions.

The NWDAF 305 may collect necessary data from the NFs (e.g., the source NF 315) in the network to provide the analytics information requested by the consumer NF 310. The data collection by the NWDAF 305 may be performed based on a request of at least one consumer NF or a subscription request. Here, the request is for one-time provision of analytics information, and the subscription request is for receiving analytics information continuously according to a period or a specific condition. The source NF 315 may provide requested network data in response to the request of the NWDAF 305 or the subscription request.

According to the standards defined by the 3GPP, the NWDAF is configured as one architectural entity in the system configuration. However, when sub-divided to actually support the operation of the NWDAF, the NWDAF may be constituted of sub-functions including at least one of data collection, data storage/lake, data learning/training, model library/repository, inference engine, or interface, and each sub component may be further sub-divided depending on its role.

To perform data collection, the NWDAF may include a data collection function that is connected to a data source, such as NF, AF, OAM, or UE to collect data. In an embodiment, the data collection function may transfer the collected data to the storage, allowing other sub-functions to use the collected data. The data learning function using the collected data may create a model by applying various analysis schemes, such as machine learning, artificial intelligence, trend analysis, and statistical analysis. The created model may be stored in the model repository. The model stored in the repository or the currently trained model may be used by the inference engine to obtain a specific analysis value or prediction value.

The NWDAF may include an interface that has the functions of receiving a request for analytics information from the consumer NF, such as the NF, AF, or OAM using the service of the NWDAF, requesting the analytics information from the inference engine, and transmitting the result to the consumer NF. There may further be configured an analysis platform that manages the life cycle of each piece of analytics information and provides a resource and execution environment to enable each piece of analytics information model to operate. In the disclosure, a description is made based on the possibility that the services constituting the NWDAF may be divided into the above-described sub-functions, but various embodiments are not limited to the NWDAF being constituted only of the above-described sub-functions.

According to an embodiment, the NWDAF instances which actually drive analytics information with resources, rather than being driven by internally executing all of the above-described functions, may create other functions by combining the functions selectively as necessary. For example, the instance configured for data collection may be driven by an instance having a data collection function or data storage function. For example, an instance providing the function of calculating and providing analytics information may be created by a type of instance to selectively perform an inference function or an interface function. A plurality of NWDAF instances having various purposes may be present in the core network of the mobile communication system. The NF to use NWDAF analytics information or the user may discover the NWDAF instance fitting the purpose of the analytics information.

The operation of selecting an appropriate NWDAF instance may consider at least one of the capacity, load, or supported serving area corresponding to the current resource level, as well as the sub-functions constituting the NWDAF instance. It is possible to select an appropriate NWDAF instance by considering at least one of the capacity, load, or service area corresponding to the current resource level, as well as the sub-functions constituting the NWDAF instance as described above. According to an embodiment, the selection of an NWDAF instance may also be referred to as NWDAF selection, service instance selection, or service selection.

FIRST EMBODIMENT

The instant embodiment may include the operation of discovering an NWDAF instance where the network function requiring real-time analytics information is able to provide analytics information within a specific time range. In an embodiment, 'real-time' may mean that the NWDAF is able to provide requested analytics information to the network function at a time earlier than the time when a specific network function requests network analytics information. In an embodiment, 'real-time' may mean an analytics delay that may be allowed when the NWDAF provides analytics information. Accordingly, in the disclosure, 'real-time' may mean the capability of providing network analytics information within a specific time range, and the specific time range requested by the network function in this case may vary depending on the purpose of each piece of analytics information.

The network analytics information may be provided by either a subscription or a request. In the case of the subscription, the NWDAF may continuously provide analytics information whenever a specific condition is met, and the consumer NF may receive the analytics information. Here, the specific condition may include, e.g., a specific cycle and/or an occurrence of a specific event. In the case of the request, immediately when receiving the request, the NWDAF may process the requested analytics information and transfer the analytics information to the consumer NF on a one-time basis.

In an embodiment, the real-time analysis-related capability for providing the real-timeness may include at least one of priority-based resource preemption, expected response time processing, expected response/notification time calculation, or fresh data collection/processing.

The priority-based resource preemption capability may denote managing resources using priority when the network functions send a request for network analytics information to the NWDAF or processes the request. For example, when a request with a higher priority is received while a request with a lower priority uses resources, the NWDAF may recover the resource allocated to the lower-priority request and redistribute the resource to the higher-priority request so that the resource for providing the network analytics information may be allocated to the request with the higher priority. In an embodiment, the NWDAF may prohibit redistributing the resources of the higher-priority request to process the lower-priority request.

The expected response time processing capability may mean that network analytics information should be transferred to the network function within a specific time range (e.g., requested time range) from the time when the network function requesting network analytics information transfers a request. In an embodiment, the specific time range may be a time range or maximum wait or delay time allowable for each piece of analytics information and be transferred to the NWDAF from the network function through a separate message or through a request or subscription.

The expected response time calculation capability may denote calculating the expected time taken for the NWDAF to complete processing of the analytics information requested by the network function and respond therewith (hereinafter, referred to as an expected response time) and transferring it to the network function. The expected response time of the analytics information may be calculated according to the type, target and range of the analytics information or the type of the filter.

The real-time information processing capability may denote collecting data meeting the specific time range condition and using it for analysis when the analytics information should be generated based on the data collected within the specific time range.

A combination of some of the above-described capabilities may be used or distributed selectively according to purposes.

The instant embodiment may include the operation for the consumer network function requesting analytics information to discover the NWDAF instance providing the above-described functions. For clarity of description in the disclosure, the instant embodiment is described using the network function (NF), but the following operations may also be used for the application function (AF) or network management system (OAM) capable of using the NWDAF.

Figure 4:
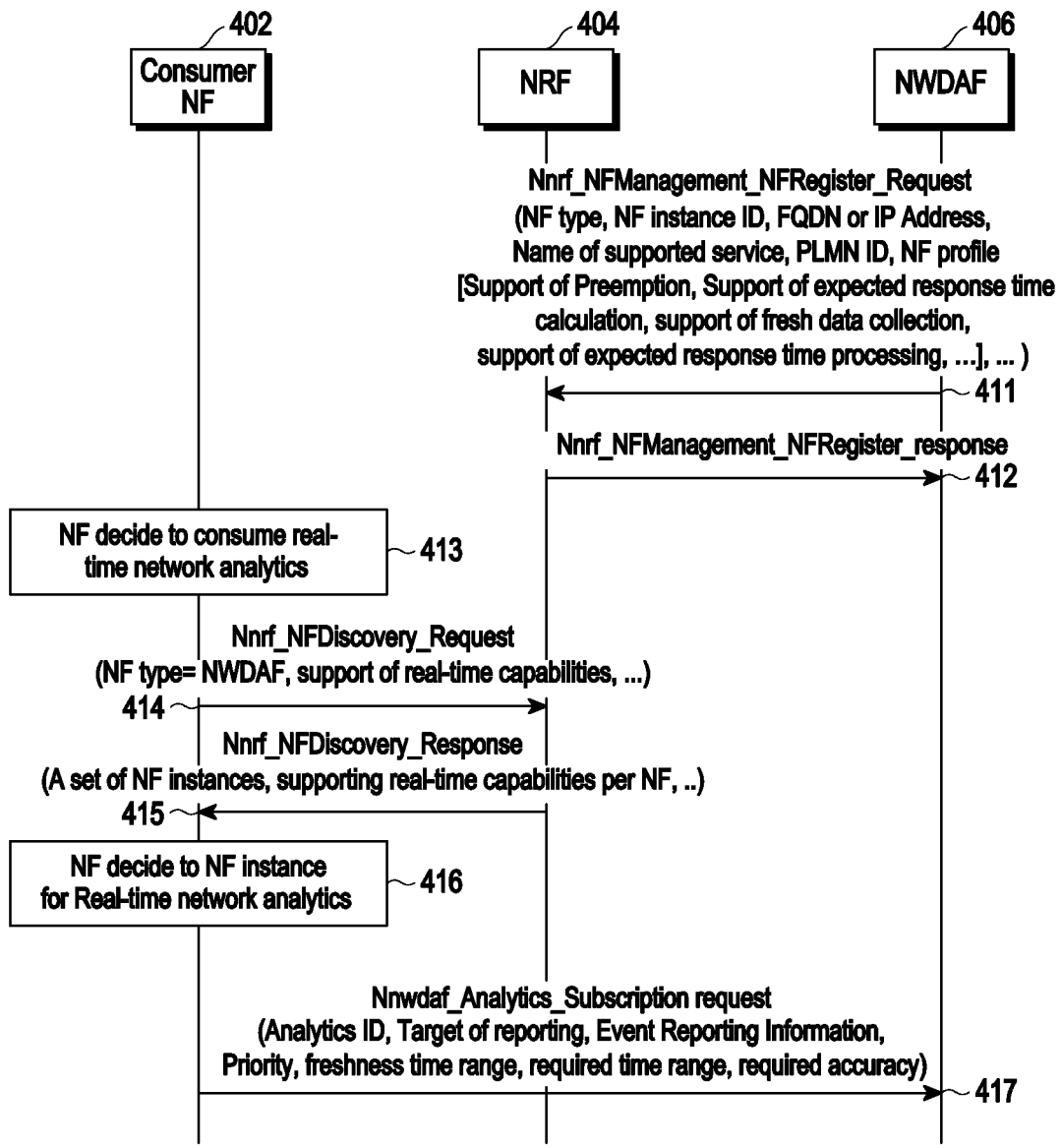
FIG. 4 illustrates an operation of registering and discovering an NWDAF according to an embodiment of the disclosure.

FIG. 4 illustrates an operation of registering and discovering an NWDAF according to an embodiment of the disclosure. The consumer network function 402 shown in FIG. 4 may use the NRF 404 to discover the NWDAF capable of providing real-time network analytics information. The NWDAF 406 may register information about the real-time analysis-related capability(ies), which may be provided by the NWDAF 406, with the NRF 404 and allow the network function 404, which is to sue the real-time network analytics information, to discover the capability. At least one of the steps described in the following embodiments may be omitted, modified, or changed in order.

Referring to FIG. 4, in step 411, the NWDAF 406 providing real-time analysis-related capability may transmit a registration request message (e.g., Nnrf_NFManagement_NRRegister_Request) for registering the real-time analysis-related capability with the NRF 404 to the NRF 404 to allow the network function requiring analytics information to discover the real-time analysis-related capability. The registration request message may include at least one parameter among the NF type, NF instance ID, fully qualified domain name (FQDN), IP address, name of supported service, PLMN ID, and NF profile defined in the 3GPP standard.

In an embodiment, the NF profile may include information about the real-time analysis-related capability of the NWDAF 406. The information included in the NF profile may be used for the NRF 404 to discover the NWDAF instance at the request of the network function (e.g., the consumer NF 402) or be transferred to the network function (e.g., the consumer NF 402) to be used to discover the capability provided by the NWDAF 406. The information about the real-time analysis-related capability of the NWDAF included in the NF profile may include at least one of priority-based resource preemption capability-related information 'support of preemption,' expected response time processing capability-related information 'support of expected response time processing,' and expected response/notification time calculation-related information 'support of expected response time calculation.' In an embodiment, the expected response time processing capability-related information may include information about the response time when the NWDAF may support for each piece of analytics information.

In step 412, the NRF 404 may transmit a registration response message (e.g., Nnrf_NFManagement_NFRegister_response) indicating that the registration of the NWDAF instance requested in step 411 is completed to the NWDAF 406.

In step 413, the consumer network function 402 may determine to use real-time network analysis. In an embodiment, the determination in step 413 may be performed according to the internal implementation of the network function 402 and/or the operator's policy.

In step 414, the network function 402 to use real-time network analysis may send a discovery request message (e.g., Nnrf_NFDiscovery_Request) for discovering the NWDAF instance providing real-time network analysis to the NRF 404. In an embodiment, the discovery request message transferred to the NRF 404 may selectively include the NF type field indicating that the type of the NF to be discovered is 'NWDAF' and information (e.g., 'support for real-time capabilities') indicating requesting at least one capability related to the provision of real-time network analysis. At least one capability selectively requested may include at least one of the capabilities defined in step 411.

In step 415, the NRF 404 may transmit a discovery response message (e.g., Nnrf_NFDiscovery_Response) including a list of NWDAF instances corresponding to the discovery request message received in step 414 (e.g., including IDs of candidate NWDAFs) to the network function 402. For example, the list of the NWDAF instances may include the ID of the NWDAF 406. The discovery response message may include information about at least one of the NF load, NF priority, and NF capabilities provided by the NRF 404 according to the standard defined by the 3GPP. In particular, the information about the NF capabilities may include information about (e.g., 'supporting real-time capabilities per NF') about at least one real-time analysis-related capability of each NWDAF instance (e.g., NWDAF 406) registered with the NRF 404 in step 411.

In step 416, the network function 402 may select at least one NWDAF instance considering loads and capabilities provided by each NWDAF instance according to the discovery response message received in step 415. In an embodiment, the network function 402 may select the NWDAF 406 having at least one desired real-time analysis-related capability based on the list of NWDAF instances including the NWDAF 406.

In step 417, the network function 402 may transfer a message (e.g., Nnwdaf_Analytics_Subscription request) for requesting a subscription or request of real-time analytics information to the NWDAF 406 corresponding to the NWDAF instance selected in step 416. In an embodiment, the subscription request message may include at least one parameter of analytics ID indicating the type of network analytics information to be requested, target of reporting, analytics filter information, event reporting information, priority, freshness (or freshness time range), required time range, or required accuracy.

SECOND EMBODIMENT

This embodiment may include a network function requesting real-time analytics information and an operation of an NWDAF instance providing requested network analytics information. The NWDAF may provide a service of network analytics information targeting multiple network functions. Accordingly, if the NWDAF has limited resources for providing network analytics information and the requests from network functions preempt the resources, the subsequent requests may not be processed. Therefore, the method for sequentially processing requests according to the times of reception may be limited in providing real-time analytics information.

In the instant embodiment, the NWDAF may provide priority-based resource preemption. When a request with higher priority is newly received by the NWDAF, the NWDAF may recover the resource of the previous request which has relatively low priority or schedule the previous request to a later time while preferentially processing the request with higher priority. To process the requests with priority as described above, the NWDAF may register information about such capability (e.g., resource preemption capability according to priority) with the NRF (e.g., the NRF 404) according to some embodiments (e.g., FIG. 4) described above.

To maintain high resource efficiency in processing the priority-based request, the time required and the amount of resources available in processing the request for each piece of analytics information may be calculated. In an embodiment, the NWDAF may perform resource allocation and scheduling between the requests through the expected response/notification time calculation capability. Additionally, the NWDAF may further increase the usability of analytics information by transferring information about the expected response time to the network function requesting network analytics information.

It are data and freshness of result that may be critical factors in processing network analytics information. When the network analytics information includes information analyzed a long time ago based on data collected a long time ago, analytics information may be provided within a short time, but accuracy and validity of the analytics information may be limited. Accordingly, the analytics information provided by the NWDAF needs to be based on the latest collected data for the network function to effectively use the analytics information. In an embodiment, as a method for maintaining the freshness of analytics information, the network function may require that the network analytics information be collected within a specific time range or be generated based on valid information within the specific time range, through freshness-related information (e.g., fresh time range).

In the disclosure, the above-described NWDAF function may be denoted as real-time information collection and processing capability (fresh data collection/processing). If there is a real-time information collection and processing capability-related request, the NWDAF may perform resource scheduling considering the request. The expected response time may be adjusted depending on whether the NWDAF has the capability.

Figure 5:
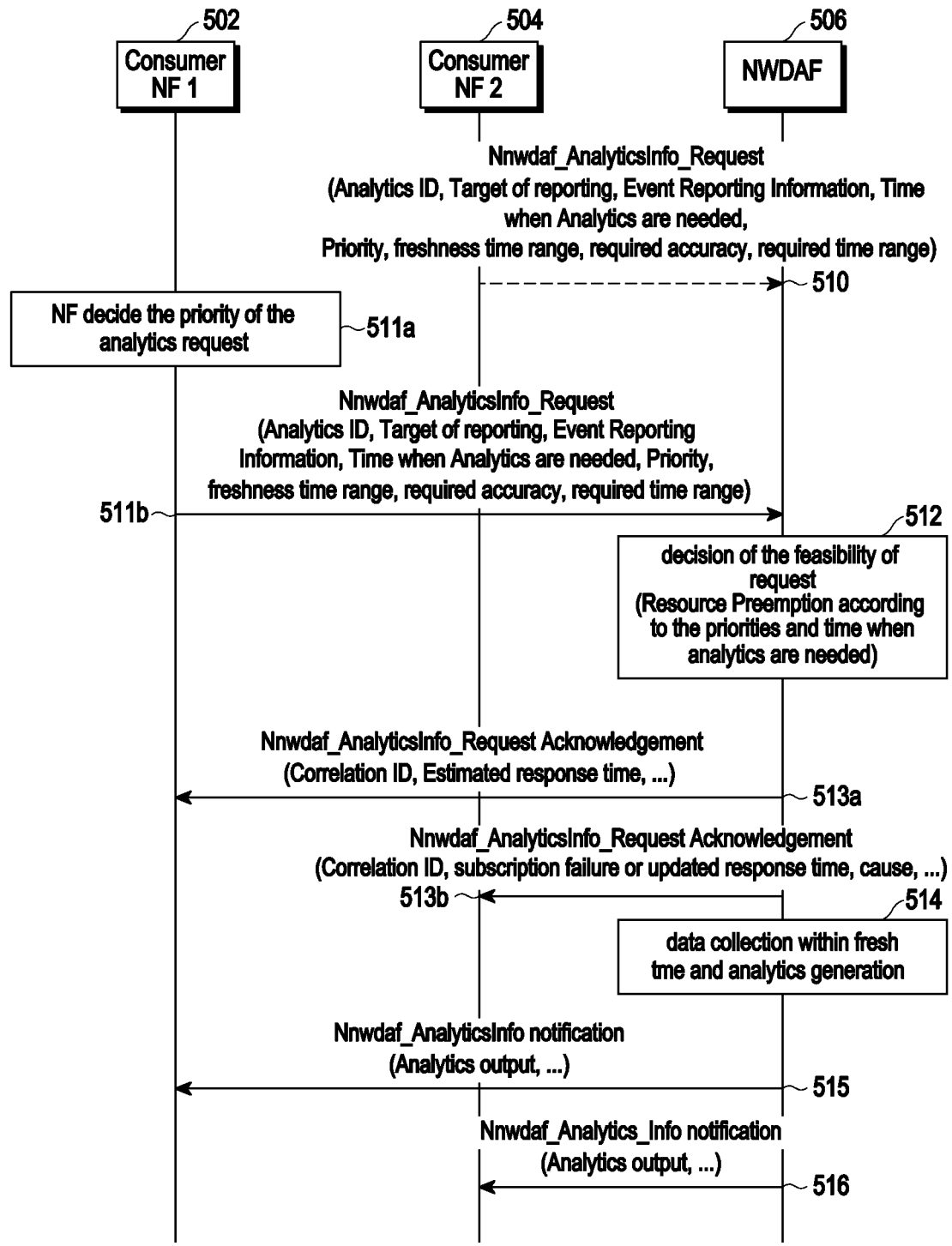
FIG. 5 is a flowchart illustrating an operation of providing real-time analytics information according to an embodiment of the disclosure.

FIG. 5 is a flowchart illustrating an operation of providing real-time analytics information according to an embodiment of the disclosure. Consumer network functions 1 and 2 502 and 504 shown in FIG. 5 may transmit a request to the NWDAF 506 to receive network analytics information. Shown here is a context where the NWDAF 506 has already received a request for network analytics information from at least one network function (e.g., consumer NF 2 504) as in step 510, as an example. At least one of the steps described in the following embodiments may be omitted, modified, or changed in order.

Referring to FIG. 5, in step 510, the NWDAF 506 may receive an analytics information request message (e.g., Nnwdaf_AnylyticsInfo_Request) for requesting network analytics information from at least one network function (e.g., network function 2 504). In an embodiment, the analytics information request message may include at least one parameter of analytics ID, target of reporting, event reporting information, time when analytics are need, priority, freshness time range, required accuracy, or required time range. The parameters are described below.

In an embodiment, in relation to the analytics information processed by the NWDAF 506, at least one subscription that continuously transfers analytics information according to at least one request, which is for a one-time purpose, specific condition or period may coexist in the NWDAF 506.

In step 511a, network function 1 502 may determine to transmit a request for network analytics information to the NWDAF 506 according to an internal algorithm or the operator's policy. Further, a priority for the request for network analytics information may be determined. In step 511b, network function 1 502 may send an analytics information request message (e.g., Nnwdaf_AnalyticsInfo_Request) to the NWDAF 506. In an embodiment, the analytics information request message may include at least one parameter of analytics ID indicating the type of network analytics information, target of reporting, analytics filter information, event reporting information, time when analytics are need, priority, freshness time range, required accuracy, or required time range.

In an embodiment, when priority is included in the analytics information request message, the NWDAF 506 may consider the priority to allocate a resource for the analytics information identified by the analytics ID. In an embodiment, when the analytics information request message includes the fresh time range, the NWDAF 506 may use the network data collected within the fresh time range to generate the analytics information identified by the analytics ID. In an embodiment, when the analytics information request message includes the required accuracy, the NWDAF 506 may generate the analytics information identified by the analytics ID according to the criterion of the required accuracy. In an embodiment, when the analytics information request message includes the required time range, the NWDAF 506 may provide the analytics information identified by the analytics ID after receiving the analytics information request message to network function 1 502 within the required time range.

In step 512, the NWDAF 506 receiving the analytics information request message in step 511b may determine feasibility of the corresponding request based on the parameters included in the analytics information request message. In an embodiment, the NWDAF 506 may calculate the priority, 'time when analytics are needed' and/or expected response time for the analytics information corresponding to the analytics information request message. When the current resource of the NWDAF 506 required to provide the analytics information is sufficiently valid, an analytics information request response message (e.g., Nnwdaf_AnalyticsInfo_Request Acknowledgement) may be transmitted to network function 1 502 in response to the request of network function 1 502 according to the operation defined in the 3GPP standard in step 513*a*.

In an embodiment, when creation of network analytics information is impossible within the required time range due to insufficient resource of the NWDAF 506, the NWDAF 506 may identify whether the NWDAF 506 has one or more requests with lower priorities than the current request corresponding to the analytics information request message received in step 511*b*. The calculation of the network analytics time may include figuring out whether to be able to create the network analytics information within the required time range by referring to the required time range included in the analytics information request message in step 511*b*. In this case, when there is a previous request (e.g., request of network function 2 504) with a lower priority than the current request, the NWDAF 506 may recover the resource of the previous request or change the scheduling time of the previous request and process the current request. Although not shown, when there is no previous request with a lower priority than the current request, the current request may be rejected.

In an embodiment, when the NWDAF 506 provides priority-related capability and fails to provide an expected response time processing-related capability, the NWDAF 506 may recover the resource of the previous request with lower priority and reallocate it to the current request. In an embodiment, when the NWDAF 506 is an NWDAF instance providing the expected response time processing-related capability without the priority-related capability, the NWDAF 506 may calculate the expected response time of each previous request and flexibly change resource scheduling. In predicting the expected response time of each piece of analytics information, the NWDAF 506 may more accurately calculate the expected response time by using the required accuracy received from the corresponding network function. In other words, the expected response time may be calculated to meet the required accuracy.

In step 513*a*, the NWDAF 506 may transfer an analytics information request response message (e.g., Nnwdaf_AnalyticsInfo_Request Acknowledgement) to network function 1 502 having requested network analytics information based on the calculation result in step 512. The analytics information request response message may include the correlation ID for the current request and, when the expected response time is calculated in step 512, may further include the calculated expected response time.

In step 512, the NWDAF 506 may determine to recover the resource of the existing request in step 510 or change the resource scheduling of the existing request by the current request in step 511*b*. When the resource is recovered so that processing of the existing request is impossible, in step 513*b*, the NWDAF 506 may transfer an analytics information request response message (e.g., 'Nnwdaf_AnalyticsInfo_Request Acknowledgement'), including the correlation ID of the analytics information corresponding to the existing request, to network function 2 504. When the expected response time is updated due to a change in resource scheduling, the analytics information request response message in step 513*b* may include the updated expected response time.

In an embodiment, the analytics information request response message may also include cause information indicating a subscription failure or a change in the expected response time due to resource scheduling or cancellation of request according to, e.g., priority. In step 513*b*, in the case of a one-time request, Nnwdaf_AnalyticsInfo_Request Acknowledgment may be used. In the case of a subscription, Nnwdaf_Analytics_Subscription response or Nnwdaf_Analytics_Subscription Acknowledgement may be used.

In step 514, to provide network analytics information requested in step 510 and step 511*b*, the NWDAF 506 may collect necessary network data and process it to create the network analytics information. In this case, when the freshness time range is included in the analytics information request message in step 511*b*, the NWDAF 506 may collect necessary network data within the time range according to the fresh time range. When the fresh time range is not included in the analytics information request message, the NWDAF 506 may collect network data according to its internal implementation.

In step 515, the NWDAF 506 may transfer an analytics information notification message (e.g., Nnwdaf_AnalyticsInfo notification or Nnwdaf_AnalyticsInfo_Request Response) including an analytics output indicating the network analytics information created in step 514, to network function 1 502.

In step 516, the NWDAF 506 may send an analytics information notification message (e.g., Nnwdaf_AnalyticsInfo notification) including the network analytics information created for the existing request rescheduled according to resource scheduling, as a response, to network function 2 504. Shown here is an example in which step 516 occurs after step 515, but step 516 may precede step 515 according to internal adjustment or calculation method.

THIRD EMBODIMENT

This embodiment may include an operation for receiving network analytics information in real-time, through a subscription for receiving network analytics information repeatedly when a specific condition is met. Unlike providing network analytics information for a one-time request according to some embodiments (e.g., FIG. 5) described above, the subscription may continuously use resources and, when a specific context occurs, continuously provide network analytics information. In the case of a subscription request required to continuously provide network analytics information, a criterion for the time for providing analytics information may be needed.

In the instant embodiment, the required time range may be used to provide information related to the response time of analytics information. In this embodiment, the required time range may denote a time range when analytics information is required with respect to the time of occurrence of a specific event. For example, when analytics information is to be sent as a response within one minute after the specific event occurs, the required time range may be one minute. For a periodic request, if the required time range is applied with respect to the start time of each period, the subscription request may be processed in the same manner applied to a series of continuous one-time requests. When an event related to a specific condition or a specific threshold needs to be processed, the NWDAF may statistically predict the period using a tool, such as mean time to happen and/or inter arrival time (TAT), through a statistical scheme and apply the required time range to the predicted period.

Figure 6:
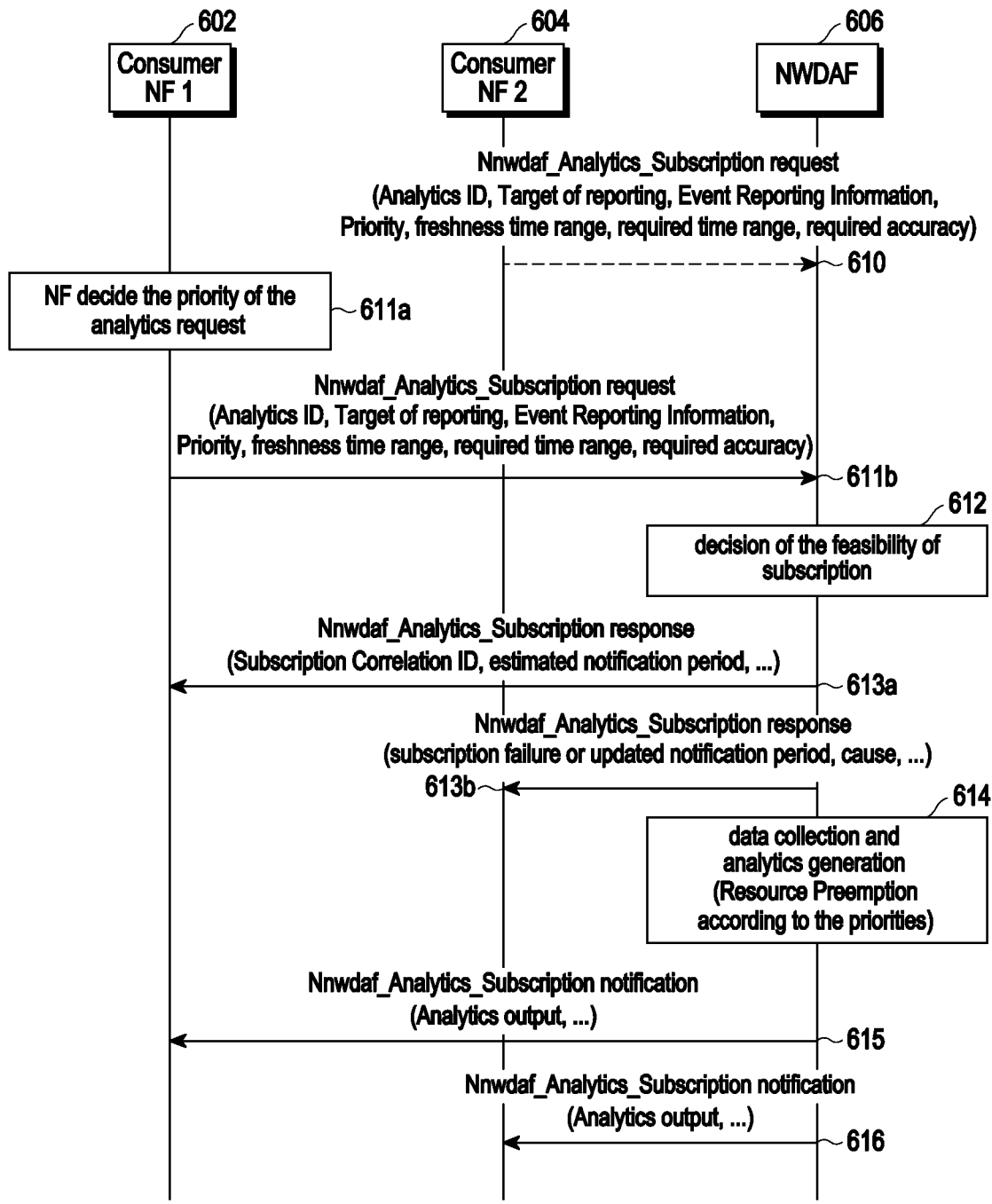
FIG. 6 is a flowchart illustrating an operation of providing real-time analytics information according to an embodiment of the disclosure.

FIG. 6 is a flowchart illustrating an operation of providing real-time analytics information according to an embodiment of the disclosure. Consumer network functions 1 and 2 602 and 604 shown in FIG. 6 may transmit a subscription request to the NWDAF 606 to receive network analytics information. Shown here is a context where a request for a subscription to network analytics information has already been received from at least one network function (e.g., consumer NF 2 604) as in step 610, as an example. At least one of the steps described in the following embodiments may be omitted, modified, or changed in order.

Referring to FIG. 6, in step 610, the NWDAF 606 may receive an analytics information subscription request message (e.g., Nnwdaf_Anylytics_Subscription request) for requesting a subscription to network analytics information from at least one network function (e.g., the network function 604). In an embodiment, the analytics information subscription request message may include at least one parameter of analytics ID, target of reporting, event reporting information, time when analytics are need, priority, freshness time range, required accuracy, or required time range.

In an embodiment, in relation to the analytics information processed by the NWDAF 606, a subscription that continuously transfers analytics information according to a one-time request, specific condition or period may coexist in the NWDAF 606.

In step 611a, network function 1 602 may determine to transmit a subscription request for network analytics information to the NWDAF 606 according to an internal algorithm or the operator's policy. Further, a priority for the subscription request for network analytics information may be determined. In step 611b, network function 1 602 may send an analytics information subscription request message (e.g., Nnwdaf_Analytics_Subscription request) to the NWDAF 606. In an embodiment, the analytics information subscription request message may include at least one parameter of analytics ID indicating the type of network analytics information, target of reporting, analytics filter information, event reporting information, priority, freshness time range, required accuracy, or required time range.

In step 612, the NWDAF 606 receiving the analytics information subscription request message in step 611b may determine feasibility of the corresponding subscription request based on the parameters included in the analytics information subscription request message. In an embodiment, the NWDAF 606 may calculate the priority and/or expected response time for the analytics information corresponding to the analytics information subscription request message. When the current resource of the NWDAF 606 required to provide the analytics information is sufficiently valid, an analytics information subscription response message (e.g., Nnwdaf_Analytics_Subscription Response or Nnwdaf_Analytics_Subscription Acknowledgement) may be transmitted to network function 1 602 in response to the subscription request of network function 1 602 according to the operation defined in the 3GPP standard in step 613a.

In an embodiment, when provision of network analytics information is impossible within the required time range due to insufficient resource of the NWDAF 606, the NWDAF 606 may identify whether the NWDAF 606 has one or more requests with lower priorities than the current request corresponding to the analytics information subscription request message received in step 611b. In an embodiment, the prediction of necessary resources and processing time may be process in a similar manner to that for the one-time request (e.g., step 512 of FIG. 5) to calculate the first one range required to provide analytics information according to the subscription request.

In an embodiment, the calculation of the network analytics time may include figuring out whether to be able to provide the network analytics information within the required time range by referring to the required time range included in the request message in step 611b. In this case, when there is a previous request with a lower priority than the current request, the NWDAF 606 may recover the resource of the previous request or change the resource scheduling of the previous request and process the current request. When there is no previous request with a lower priority than the current request, the current request may be rejected.

In an embodiment, when the NWDAF 606 provides priority-related capability and fails to provide an expected response time processing-related capability, the NWDAF 606 may recover the resource of the previous request with lower priority and reallocate it to the current request. In an embodiment, when the NWDAF 606 is an NWDAF instance providing the expected response time processing-related capability without the priority-related capability, the NWDAF 606 may calculate the expected response time of each previous request and flexibly change resource scheduling. In predicting the expected response time of each piece of analytics information, the NWDAF 606 may more accurately calculate the expected response time by using the required accuracy received from the corresponding network function.

In step 613a, the NWDAF 606 may transfer an analytics information subscription response message (e.g., Nnwdaf_Analytics_Subscription response) to network function 1 602 having requested network analytics information based on the calculation result in step 612. In an embodiment, the analytics information subscription response message may include the correlation ID for the current request and, when the expected response time is calculated in step 612, may further include the calculated expected response time. In an embodiment, in step 612, the NWDAF 606 may calculate the expected response time corresponding to the first one range based on the factors of the request or may calculate the estimated notification period (or estimated notification time range) for providing analytics information according to the subscription request. In this case, the analytics information subscription response message in step 613a may include the calculated estimated notification period.

In step 612, the NWDAF 606 may determine to recover the resource of the existing request in step 610 or change the resource scheduling of the existing request by the current request in step 611b. When the resource is recovered so that processing of the existing request is impossible, in step 613b, the NWDAF 606 may transfer an analytics information subscription response message, including cause information, such as failure in subscription for the existing request, to the network function (e.g., network function 2 604). When the estimated notification period (or estimated notification time range) is changed due to a change in resource scheduling, the analytics information subscription response message in step 613b may include the updated estimated notification period (or estimated notification time range).

In an embodiment, the analytics information subscription response message may include the subscription correlation ID for identifying the corresponding analytics information and/or cause information. In an embodiment, the cause information may indicate a change in the estimated notification period (or estimated notification time range) due to the resource scheduling or cancellation of request according to priority. In step 613b, in the case of a one-time request, Nnwdaf_AnalyticsInfo_Request Acknowledgment may be used. In the case of a subscription, Nnwdaf_Analytics_Subscription response or Nnwdaf_Analytics_Subscription Acknowledgement may be used.

In step 614, to provide network analytics information requested in step 610 and step 611*b*, the NWDAF 606 may collect necessary network data and process it to create the network analytics information. In this case, when the freshness time range is included in the analytics information subscription request message in step 611*b*, the NWDAF 606 may collect necessary network data within the time range according to the fresh time range. When the fresh time range is not included in the analytics information subscription request message, the NWDAF 606 may collect network data according to its internal implementation.

In step 615, the NWDAF 606 may transfer an analytics information subscription notification message (e.g., Nnwdaf_Analytics_Subscription notification or Nnwdaf_AnalyticsInfo notification) including an analytics output indicating the network analytics information created in step 614, to network function 1 602.

In step 616, the NWDAF 606 may send an analytics information subscription notification message (e.g., Nnwdaf_Analytics_Subscription notification) including the network analytics information created for the existing request rescheduled according to resource scheduling, as a response, to network function 2 604. Shown here is an example in which step 616 occurs after step 615, but step 616 may precede step 615 according to internal adjustment or calculation method.

FOURTH EMBODIMENT

This embodiment may include the operation for the network function requesting the network analytics information to correspond to a change in the expected response time received from the NWDAF due to priority or resource scheduling in receiving network analytics information.

The network function may first transmit an analytics information request to the NWDAF when there is a purpose of requesting analytics information according to its own algorithm or the operator's policy. Although the network analytics information is not received within a specific time range (e.g., the required time range), it may be sometimes advantageous that the network function utilizes the network analytics information. When it is changed whether to provide analytics information or the expected response time is changed, the network function may determine to change some parameters used for the request or accept the changed expected response time instead of simply canceling the request for the analytics information.

When a change is made to the provision of pre-requested analytics information, the NWDAF may notify the network function requesting the analytics information of the change. The network function may more flexibly use the analytics information provided from the NWDAF by determining whether to accept the changed information as it is and determining to change the parameters related to the request for the analytics information, in response to the notification.

Figure 7:
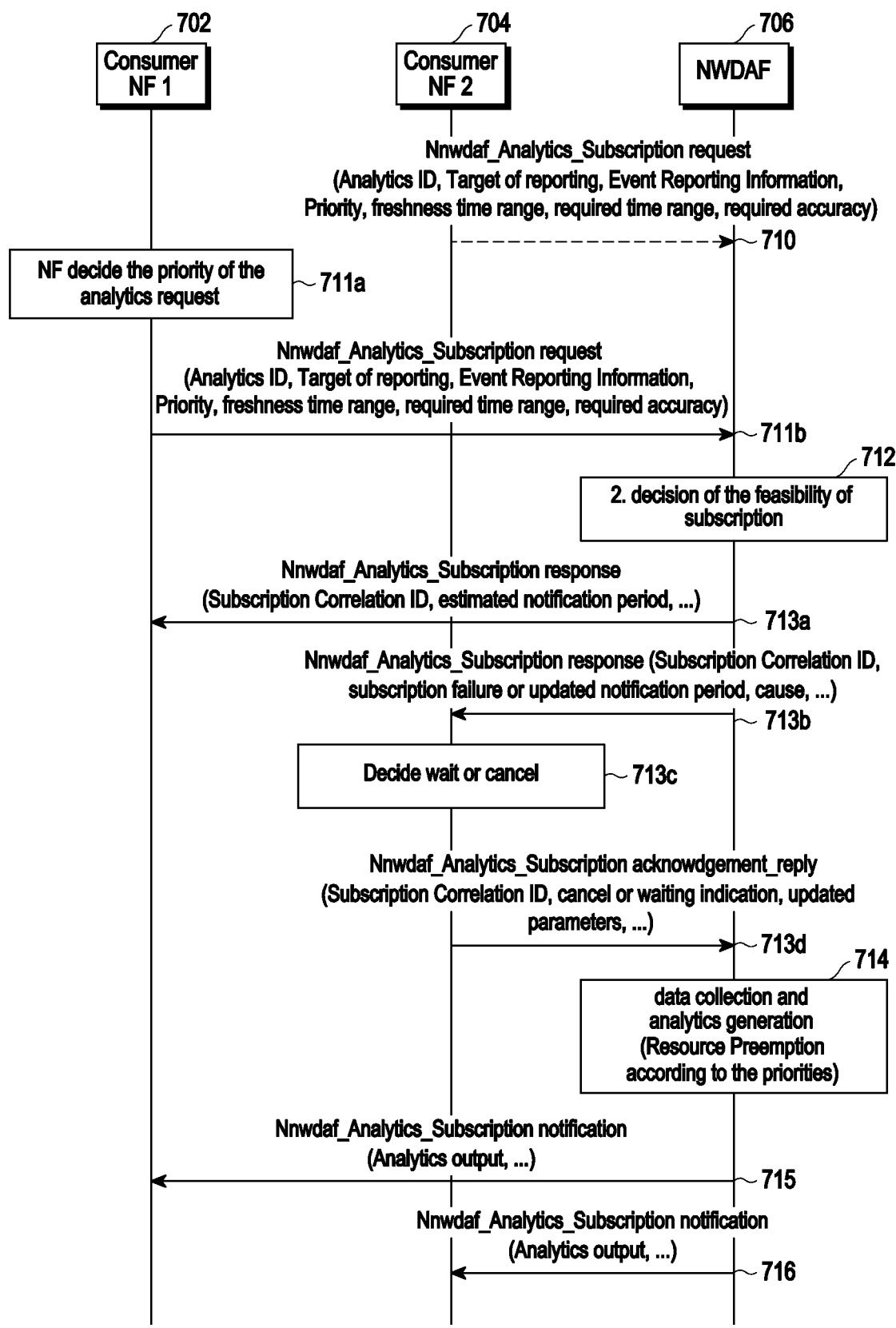
FIG. 7 is a flowchart illustrating an operation corresponding to a change in an analytics information request according to an embodiment of the disclosure.

FIG. 7 is a flowchart illustrating an operation corresponding to a change in an analytics information request according to an embodiment of the disclosure. The illustrated procedure may be applied to both a one-time request (e.g., FIG. 5) for analytics information and continuous subscription (e.g., FIG. 6) and, for convenience purposes, the following description is based on a subscription. Shown here is a context where a request for a subscription to network analytics information has already been received from at least one other network function 704 as in step 710, as an example. At least one of the steps described in the following embodiments may be omitted, modified, or changed in order.

Referring to FIG. 7, in step 710, the NWDAF 706 may receive an analytics information subscription request message (e.g., Nnwdaf_Analytics_Subscription request) from at least one network function (e.g., network function 2 704). In relation to analytics information being processed by the NWDAF 706, at least one request and at least one subscription may coexist within the NWDAF 706.

In step 711*a*, network function 1 702 may determine to transmit a subscription request for network analytics information to the NWDAF 706 according to an internal algorithm or the operator's policy. Further, a priority for the request for network analytics information may be determined. In step 711*b*, network function 1 702 may send an analytics information subscription request message (e.g., Nnwdaf_Analytics_Subscription request) to the NWDAF 706. In an embodiment, the analytics information subscription request message may include at least one parameter of analytics ID indicating the type of network analytics information, target of reporting, analytics filter information, event reporting information, priority, freshness time range, required accuracy, or required time range.

In step 712, the NWDAF 706 receiving the analytics information subscription request message in step 711*b* may determine feasibility of the corresponding subscription request based on the parameters according to the analytics information subscription request message. In an embodiment, the NWDAF 706 may calculate the priority and/or expected response time for the analytics information corresponding to the analytics information subscription request message. When the current resource of the NWDAF 706 required to provide the analytics information is sufficiently valid, an analytics information subscription response message (e.g., Nnwdaf_Analytics_Subscription Response or Nnwdaf_Analytics_Subscription Acknowledgement) may be transmitted to network function 1 702 in response to the subscription request of network function 1 702 according to the operation defined in the 3GPP standard in step 713*a*.

In an embodiment, when provision of network analytics information is impossible within the required time range due to insufficient resource of the NWDAF 706, the NWDAF 706 may identify whether the NWDAF 706 has one or more requests with lower priorities than the current request corresponding to the analytics information subscription request message received in step 711*b*. In an embodiment, the prediction of necessary resources and processing time may be process in a similar manner to that for the one-time request (e.g., step 512 of FIG. 5) to calculate the first one range required to provide analytics information according to the subscription request.

In an embodiment, the calculation of the network analytics time may include figuring out whether to be able to provide the network analytics information within the required time range by referring to the required time range included in the request message in step 711*b*. In this case, when there is a previous request with a lower priority than the current request, the NWDAF 706 may recover the resource of the previous request or change the resource scheduling of the previous request and process the current request. When there is no previous request with a lower priority than the current request, the current request may be rejected.

In an embodiment, when the NWDAF 706 provides priority-related capability and fails to provide an expected response time processing-related capability, the NWDAF 706 may recover the resource of the previous request with lower priority and reallocate it to the current request. In an embodiment, when the NWDAF 706 is an NWDAF instance providing the expected response time processing-related capability without the priority-related capability, the NWDAF 706 may calculate the expected response time of each previous request and flexibly change resource scheduling. In predicting the expected response time of each piece of analytics information, the NWDAF 706 may more accurately calculate the expected response time by using the required accuracy received from the corresponding network function.

In step 713a, the NWDAF 706 may transfer an analytics information subscription response message (e.g., Nnwdaf_analytics_Subscription response) to network function 1 702 having requested network analytics information based on the calculation result in step 712. In an embodiment, the analytics information subscription response message may include the correlation ID for the current request and, when the expected response time is calculated in step 712, may further include the calculated expected response time. In an embodiment, the analytics information subscription response message in step 3a may include the estimated notification period corresponding to the subscription request.

In step 712, the NWDAF 706 may determine to recover the resource of the existing request in step 710 or change the resource scheduling of the existing request by the current request in step 711b. When the resource is recovered so that processing of the existing request is impossible, in step 713b, the NWDAF 706 may transfer an analytics information subscription response message, including cause information, such as failure in subscription for the existing request, to the network function (e.g., network function 2 704). When the estimated notification period (or estimated notification time range) is changed due to a change in resource scheduling, the analytics information subscription response message in step 713b may include the updated estimated notification period (or estimated notification time range).

In an embodiment, the analytics information subscription response message may include the subscription correlation ID for identifying the corresponding analytics information and/or cause information. In an embodiment, the cause information may indicate a change in the estimated notification period (or estimated notification time range) due to the resource scheduling or cancellation of request according to priority. In step 713b, in the case of a one-time request, Nnwdaf_AnalyticsInfo_Request Acknowledgment may be used. In the case of a subscription, Nnwdaf_Analytics_Subscription response or Nnwdaf_Analytics_Subscription Acknowledgement may be used.

Upon recognizing that there is a change related to the request of step 710 through the analytics information subscription response message, network function 2 704 may determine any one of cancellation of the request, acceptance of the changed information, or change of the request factor. Network function 2 704 may wait for reception of the analytics information according to the change or cancel the request according to the determination.

In step 713d, the network function 704 may transmit an analytics information subscription response reply message (e.g., Nnwdaf_Analytics_Subscription acknowdgement_reply) including the determination result to the NWDAF 706. The analytics information subscription response reply message may include the correlation ID for identifying the target analytics information, 'cancel or waiting indication' which is information indicating whether to cancel or wait for a request for analytics information and/or one or more changed parameters. In this case, the changed parameters may include a value changed for at least one of the parameters transferred in step 710.

In step 714, to provide network analytics information requested in step 711b and step 713d, the NWDAF 706 may collect necessary network data and process it to create the network analytics information. In this case, when the freshness time range is included in the analytics information subscription request message in step 711b, the NWDAF 706 may collect necessary network data within the time range according to the fresh time range. When the fresh time range is not included in the analytics information subscription request message, the NWDAF 706 may collect network data according to its internal implementation.

In step 715, the NWDAF 706 may transfer an analytics information subscription notification message (e.g., Nnwdaf_Analytics_Subscription notification or Nnwdaf_AnalyticsInfo notification) including an analytics output indicating the network analytics information created in step 714, to network function 1 702.

In step 716, the NWDAF 706 may send an analytics information subscription notification message (e.g., Nnwdaf_Analytics_Subscription notification) including the network analytics information created for the existing request rescheduled according to resource scheduling, as a response, to network function 2 704. Shown here is an example in which step 716 occurs after step 715, but step 716 may precede step 715 according to internal adjustment or calculation method.

FIFTH EMBODIMENT

As in some embodiments described above, the NWDAF instance may receive a request for network analytics information from a plurality of network functions. The NWDAF may perform resource allocation and scheduling on its own according to the requests. To provide network analytics information, the NWDAF may collect various network data created from the network, necessary to generate analytics information.

The network data may be collected from the UE present over the network, OAM, and/or network functions. To generate and transfer the requested network analytics information within a required time, the NWDAF may complete collection of network data within a limited time. Further, to generate network analytics information as described above in some embodiments, the NWDAF may collect specific network data within a specific time range (e.g., the required time range). To that end, the NWDAF may collect network data within a limited expected response time.

The instant embodiment may include the operation of utilizing the priority and required event transfer time range in determining the event of each network function. In the following embodiment, the priority may be the priority included in the HTTP/JSON message used in the 5G core network or may be the priority included in the subscription request message.

Figure 8:
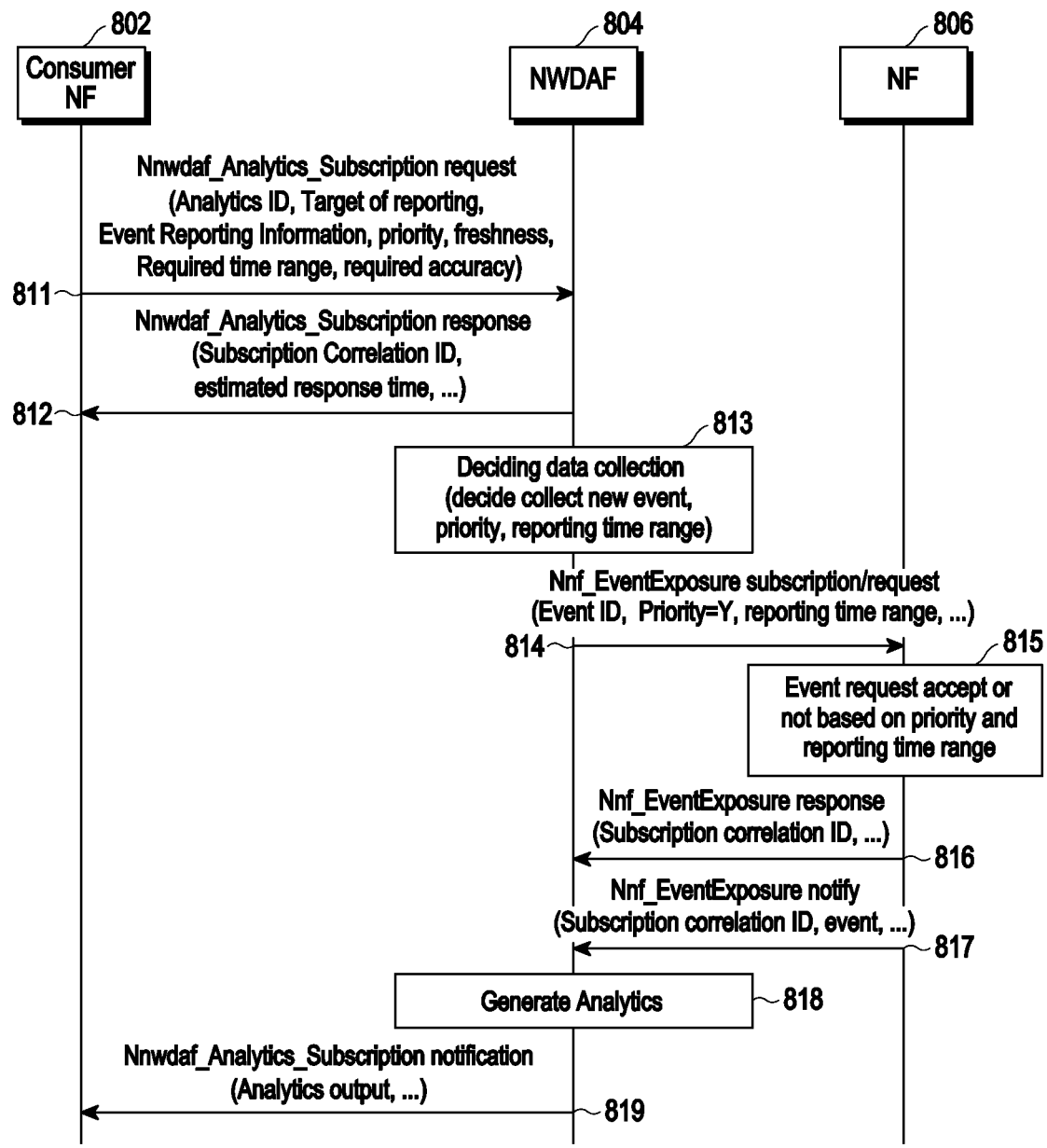
FIG. 8 is a flowchart illustrating an operation for providing analytics information within a limited time according to an embodiment of the disclosure.

FIG. 8 is a flowchart illustrating an operation for providing analytics information within a limited time range according to an embodiment of the disclosure. The illustrated procedure may be applied to both a one-time request and a continuous subscription and, for convenience purposes, the procedure of the instant embodiment may be described based on a subscription. Shown here is a context of collecting network data from at least one network function (e.g., the network function 806) in response to a request from a consumer network function 802, for example. At least one of the steps described in the following embodiments may be omitted, modified, or changed in order.

Referring to FIG. 8, in step 811, the network function 802 may determine to request network analytics information from the NWDAF 804 according to the internal algorithm or the operator's policy and transmit an analytics information subscription request message (e.g., Nnwdaf_Analytics_Subscription request) to the NWDAF 804. In an embodiment, the analytics information subscription request message may include at least one parameter of analytics ID indicating the type of network analytics information, target of reporting, analytics filter information, event reporting information, priority, freshness time range, required accuracy, or required time range.

The NWDAF 804 may calculate the priority and/or expected response time based on the parameters included in the analytics information subscription request message. When the current resource of the NWDAF 804 required to provide the analytics information is sufficiently valid, an analytics information subscription response message (e.g., Nnwdaf_Analytics_Subscription Response or Nnwdaf_Analytics_Subscription Acknowledgement) may be transmitted from the NWDAF 804 to the network function 802 in response to the subscription request of the network function 802 according to the operation defined in the 3GPP standard in step 812.

In an embodiment, when provision of network analytics information is impossible within the required time range due to insufficient resource of the NWDAF 804, the NWDAF 804 may identify whether the NWDAF 804 has one or more requests with lower priorities than the current request corresponding to the analytics information subscription request message received in step 811. In an embodiment, according to the internal algorithm of the NWDAF 804, the prediction of necessary resources and processing time may be process in a similar manner to that for the one-time request (e.g., step 512 of FIG. 5) to calculate the first one range required to provide analytics information according to the subscription request.

The calculation of the network analytics time may include figuring out whether to be able to provide the network analytics information within the required time range by referring to the required time range included in the request message in step 811. In this case, when there is a previous request with a lower priority than the current request, the NWDAF 804 may recover the resource of the previous request or change the resource scheduling of the previous request and process the current request. When there is no previous request with a lower priority than the current request, the current request may be rejected.

In an embodiment, when the NWDAF 804 provides priority-related capability and fails to provide an expected response time-related capability, the NWDAF 804 may recover the resource of the previous request with lower priority and reallocate it to the current request. In an embodiment, when the NWDAF 804 is an NWDAF instance providing the expected response time processing-related capability without the priority-related capability, the NWDAF 804 may calculate the expected response time of each previous request and flexibly change resource scheduling. In predicting the expected response time of each piece of analytics information, the NWDAF 804 may more accurately calculate the expected response time by using the required accuracy received from the corresponding network function.

The analytics information subscription response message of step 812 may include the correlation ID for the current request and, when the expected response time is calculated, may further include the calculated expected response time.

In step 813, the NWDAF 804 may determine to collect necessary network data to generate network analytics information based on the current request in step 811. In this case, when the freshness time range is included in the analytics information subscription request message in step 811, the NWDAF 804 may collect necessary network data within the time range according to the fresh time range. When the fresh time range is not included, the NWDAF 804 may collect network data according to its internal implementation.

In an embodiment, when the NWDAF 804 collects network data from the network function 806, low-priority events may be disregarded or an event notification under a specific condition may be delayed according to the settings of the network function 806. To prevent this, in creating an event subscription request for the network function 806, the NWDAF 804 may determine a reporting time range and/or priority (e.g., priority=Y) related to each event. In this case, the used priority and reporting time range may differ from the factors received in step 811.

In step 814, the NWDAF 804 may transmit an event exposure subscription message (e.g., Nnf_EventExposure subscription) or an event exposure request message (e.g., Nnf_EventExposure request) to the corresponding network function 806 for the event subscription request for collecting network data. The event exposure subscription request message may include at least one of the reporting time range, the priority (=Y) related to the corresponding event, or the event ID for identifying each event determined in step 813 along with the subscription correlation ID for identifying the event subscription request. In an embodiment, the NWDAF 804 may transmit an analytics information subscription request message (e.g., Nnwdaf_Analytics_Subscription request or Nnwadf_AnalyticInfo_Request) to another NWDAF to request analytics information from the other NWDAF.

In step 815, the network function 806 may determine whether it is possible to provide network data requested from the NWDAF 804 in response to the event exposure subscription message. In this case, the network function 806 may determine whether the event is acceptable by referring to the reporting time range and the priority of the event according to the event exposure subscription message. As an embodiment, the network function 806 may be an AMF, an SMF, an NWDAF, an OAM, a UE, or an AF.

In step 816, the network function 806 may transfer an event exposure response message (e.g., Nnf_EventExposure response) indicating whether to accept the requested event to the NWDAF 804. In an embodiment, the event exposure response message may include the subscription correlation ID for identifying the corresponding event subscription.

In step 817, when the requested event occurs, the network function 806 may transfer an event exposure notification message (e.g., Nnf_EventExposure notify) including the network data according to the event to the NWDAF 804. The event exposure notification message may include event information and/or network data, as necessary, together with the subscription correlation ID for identifying the corresponding event subscription.

In step 818, when sufficient network data is collected, the NWDAF 804 may generate network analytics information based thereupon.

In step 819, the NWDAF 804 may transfer the generated network analytics information to the network function 802 through an analytics information subscription notification message.

Figure 9:
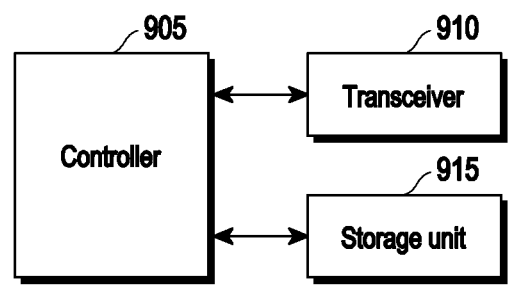
FIG. 9 is a block diagram illustrating a configuration of a network entity according to an embodiment of the disclosure.

FIG. 9 is a block diagram illustrating a configuration of a network entity according to an embodiment of the disclosure. Further, the term " . . . unit" and the suffix" . . . er" as used herein denote a unit processing at least one function or operation and be implemented in hardware, software, or a combination thereof. The configuration of the network entity shown in FIG. 9 may represent the configuration of the network entity shown in FIG. 1. For example, the configuration of the network entity shown in FIG. 9 may mean the structure of the NWDAF. However, without limitations thereto, the configuration of the network entity shown in FIG. 9 may mean the configuration of at least one of the AMF, the SMF, or the PCF.

Referring to FIG. 9, the network entity may include a transceiver 910, a controller 905, and a storage unit 915. In the disclosure, the controller may be defined as a circuit or application-specific integrated circuit or at least one processor. According to an embodiment, the above-described network entity may be referred to as a core network entity.

The transceiver 910 may transmit and receive signals to/from other network entities. The transceiver 910 may provide an interface for communicating with other devices in the network. In other words, the transceiver 910 may convert the bit string transmitted from the network entity to another device into a physical signal and convert the physical signal received from the other device into a bit string. In other words, the transceiver 910 may transmit and receive signals. Accordingly, the transceiver 910 may be referred to as a modem, a transmitter, a receiver, a communication unit, or a communication module. In this case, the transceiver 910 may enable the network entity to communicate with other devices or systems via a backhaul connection (e.g., wired backhaul or wireless backhaul) or other connection methods or via a network.

The storage unit 915 may store at least one of a basic program for operation of the network entity, an application program, or configuration information. The storage unit 915 may be configured as a volatile memory, a non-volatile memory, or a combination of a volatile memory and a non-volatile memory. The storage unit 915 may store at least one of information transmitted/received via the transceiver 910 and information generated via the controller 905. For example, the storage unit 915 may store information required for collecting network data and providing analytics information according to the above-described embodiments.

The controller 905 may control the overall operation of the network entity according to at least one or a combination of the embodiments proposed in the disclosure. For example, the controller 905 may control the signal flow between entities to perform the operations according to the procedures described above in connection with FIGS. 2 to 8. For example, the controller 905 may control other components to collect network data and provide analytics information in the wireless communication system according to an embodiment of the disclosure.

Disclosed are: a communication technique for merging, with an IoT technology, a 5G communication system for supporting a data transmission rate higher than that of a 4G system; and a system therefor. The disclosure can be applied to an intelligent service (for example, smart home, smart building, smart city, smart car or connected car, health care, digital education, retail, security and safety-related services, and the like) on the basis of a 5G communication technology and an IoT-related technology. Embodiments of the disclosure may include a method for dividing the NWDAF into sub-functions and efficiently discovering and selecting them. Thus, calculation efficiency of analytics information and resources required for calculation may be efficiently managed. Further, the cost of creating, managing, and maintaining models may be reduced by transferring models used to calculate analytics information or by supporting collaborative learning. Thus, in terms of using analytics information, optimized analytics information with a high level of accuracy and satisfaction may be transferred at an appropriate time depending on the situation.

The methods according to the embodiments described in the specification or claims of the disclosure may be implemented in hardware, software, or a combination of hardware and software.

When implemented in software, there may be provided a computer readable storage medium or computer program product storing one or more programs (software modules). One or more programs stored in the computer readable storage medium or computer program product are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the disclosure, the term "computer program product" or "computer readable medium" is used to collectively refer to media, such as memory, a hard disk installed in a hard disk drive, and signals. The "computer program product" or "computer readable medium" is means provided to the method for selecting an NWDAF instance according to the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the present disclosure have been described above, various changes may be made thereto without departing from the scope of the present disclosure. Thus, the scope of the disclosure should not be limited to the above-described embodiments, and should rather be defined by the following claims and equivalents thereof

The invention claimed is:

1. A method for providing network analytics information by a network data collection and analysis function (NWDAF) entity, the method comprising:
   receiving a request message including analytics ID and first information indicating when analytics information is needed, from a consumer network function (NF);
   transmitting, to the consumer NF, a response message including second information indicating updated response time determined based on the first information, in response to the request message; and
   transmitting the analytics information the consumer NF.

2. The method of claim 1, further comprising:
   when the analytics information is unable to be provided within a time range corresponding to the first information, determining whether there is a previous request having a lower priority than a priority of the analytics information identified from the request message; and
   when there is the previous request having the lower priority, recovering a resource of the previous request and allocating the resource to a request for the analytics information.

3. The method of claim 2, further comprising transmitting a response message including either information indicating request cancellation or information indicating an updated response time to an NF related to the previous request.

4. The method of claim 1, wherein the updated response time is calculated based on a required accuracy included in the request message.

5. The method of claim 1, further comprising:
   transmitting a registration request message including capability information related to support of expected response time processing to a network repository function (NRF); and
   receiving a registration response message corresponding to the registration request message from the NRF,
   wherein the capability information includes information about a response time supportable for each analytics.

6. The method of claim 1, further comprising:
   transmitting an event exposure subscription request including at least one of an event identifier (ID) for identifying an event, an event priority, or an event reporting time range to a source NF related to the analytics information; and
   receiving an event exposure response message indicating whether to accept the event subscription request from the source NF.

7. The method of claim 1, wherein the request message comprises an analytics subscription request message.

8. The method of claim 1, wherein the request message comprises an analytics information request message.

9. An apparatus of a network data collection and analysis function (NWDAF) entity providing network analytics information, comprising:
   a transceiver; and
   a controller functionally connected with the transceiver, wherein the controller is configured to:
      receive a request message including analytics ID and first information including information indicating when analytics information is needed, from a consumer network function (NF),
      transmit, to the consumer NF, a response message including second information indicating updated response time determined based on the first information, in response to the request message, and
      transmit the analytics information to the consumer NF.

10. The apparatus of claim 9, wherein the controller is further configured to:
   when the analytics information is unable to be provided within a time range corresponding to the first information, determine whether there is a previous request having a lower priority than a priority of the analytics information identified from the request message; and
   when there is the previous request having the lower priority, recover a resource of the previous request and allocate the resource to a request for the analytics information.

11. The apparatus of claim 10, wherein the controller is further configured to transmit a response message including either information indicating request cancellation or information indicating an updated response time to an NF related to the previous request.

12. The apparatus of claim 9, wherein the updated response time is calculated based on a required accuracy included in the request message.

13. The apparatus of claim 9,
   wherein the controller is further configured to:
      transmit a registration request message including capability information related to support of expected response time processing to a network repository function (NRF), and
      receive a registration response message corresponding to the registration request message from the NRF, and
   wherein the capability information includes information about a response time supportable for each analytics.

14. The apparatus of claim 9, wherein the controller is further configured to:
   transmit an event exposure subscription request including at least one of an event identifier (ID) for identifying an event, an event priority, or an event reporting time range to a source NF related to the analytics information; and
   receive an event exposure response message indicating whether to accept the event subscription request from the source NF.

15. The apparatus of claim 9, wherein the request message comprises an analytics subscription request message.

16. The apparatus of claim 9, wherein the request message comprises an analytics information request message.

17. An apparatus of a network function (NF) entity providing network analytics information in a wireless communication network, comprising:
   a transceiver; and
   a controller functionally connected with the transceiver, wherein the controller is configured to:
      transmit a discovery request message including capability information related to support of real-time analytics to a network repository function (NRF),
      receive a discovery response message including a list of at least one network data collection and analysis function (NWDAF) related to the support of real-time analytics from the NRF,
      select a first NWDAF based on the list,
      transmit a request message including analytics ID and first information indicating when analytics information is needed, to the first NWDAF,
      receive, from the first NWDAF, a response message including second information indicating updated response time determined based on the first information, in response to the request message, and receive the analytics information from the NWDAF.

18. The apparatus of claim 17, wherein the updated response time is calculated based on a required accuracy included in the request message.

19. The apparatus of claim 17, wherein the controller is further configured to:
select the first NWDAF with a capability related to the support of real-time analytics from the list.

20. The apparatus of claim 17, wherein the request message comprises either an analytics subscription request message or an analytics information request message.

* * * * *